(12) United States Patent
Kim et al.

(10) Patent No.: US 11,568,458 B2
(45) Date of Patent: **\*Jan. 31, 2023**

(54) SYSTEM AND METHOD FOR NETWORK INTERACTION BETWEEN COMPUTING DEVICES

(71) Applicant: BlackBerry Limited, Waterloo (CA)

(72) Inventors: Sang-Heun Kim, Mississauga (CA); Charles Laurence Stinson, Mississauga (CA); Martyn Mallick, Waterloo (CA)

(73) Assignee: BlackBerry Limited, Waterloo (CA)

( \* ) Notice: Subject to any disclaimer, the term of this patent is extended or adjusted under 35 U.S.C. 154(b) by 0 days.

This patent is subject to a terminal disclaimer.

(21) Appl. No.: 17/496,542

(22) Filed: Oct. 7, 2021

(65) Prior Publication Data

US 2022/0027966 A1    Jan. 27, 2022

Related U.S. Application Data

(63) Continuation of application No. 12/016,248, filed on Jan. 18, 2008, now Pat. No. 11,157,975.

(51) Int. Cl.
*G06Q 30/06* (2012.01)
*G06F 21/12* (2013.01)

(52) U.S. Cl.
CPC ........... *G06Q 30/06* (2013.01); *G06F 21/121* (2013.01)

(58) Field of Classification Search
CPC .............................. G06Q 30/06; G06F 21/121
USPC .......................................................... 705/50
See application file for complete search history.

(56) References Cited

U.S. PATENT DOCUMENTS

| 5,583,983 | A | 12/1996 | Schmitter |
| 5,995,102 | A | 11/1999 | Rosen et al. |
| 6,295,061 | B1 | 9/2001 | Park et al. |
| 6,828,988 | B2 | 12/2004 | Hudson et al. |
| 6,882,825 | B2 | 4/2005 | Hopkins et al. |
| 6,904,569 | B1 | 6/2005 | Anderson |
| 7,032,036 | B2 | 4/2006 | Linsley |

(Continued)

FOREIGN PATENT DOCUMENTS

| CA | 2649959 C | 7/2014 |
| EP | 1736878 A1 | 12/2006 |

(Continued)

OTHER PUBLICATIONS

Tanenbaum, Andrew S.; "Computer Networks, Fourth Edition"; Section 7.3: The World Wide Web; Prentice Hall PTR; Upper Saddle River, NJ; 2003; 65 pages.

(Continued)

*Primary Examiner* — Zeshan Qayyum
(74) *Attorney, Agent, or Firm* — Conley Rose, P.C.; J. Robert Brown, Jr.

(57) ABSTRACT

The present specification provides, amongst other things, a method and system for network interaction between computing devices. In one embodiment a wireless client machine is provided that includes a mini web-browser that is configured to access a secure web-page from a web-server. The secure web-page includes an interactive form. The wireless client machine is also configured to access a schema that corresponds to the secure web-page. The wireless client machine is configured to render the secure web-page using the contents of the schema.

20 Claims, 13 Drawing Sheets

(56) References Cited

U.S. PATENT DOCUMENTS

| | | |
|---|---|---|
| 7,320,107 B2 | 1/2008 | Chwa |
| 7,376,913 B1 | 5/2008 | Fleck et al. |
| 2002/0054161 A1 | 5/2002 | Durham |
| 2002/0065842 A1 | 5/2002 | Takagi et al. |
| 2002/0133540 A1 | 9/2002 | Sears, Jr. et al. |
| 2003/0020747 A1 | 1/2003 | Korala |
| 2003/0078960 A1 | 4/2003 | Murren et al. |
| 2003/0088716 A1 | 5/2003 | Sanders |
| 2004/0027373 A1 | 2/2004 | Jacquot et al. |
| 2005/0114757 A1* | 5/2005 | Sahota ............. H04N 21/25883 715/239 |
| 2005/0132286 A1 | 6/2005 | Rohrabaugh et al. |
| 2006/0015649 A1* | 1/2006 | Zutaut ................... H04L 67/303 709/219 |
| 2006/0064411 A1 | 3/2006 | Gross et al. |
| 2006/0143568 A1 | 6/2006 | Milener et al. |
| 2007/0028303 A1 | 2/2007 | Brennan |
| 2007/0113237 A1 | 5/2007 | Hickson |
| 2007/0180144 A1* | 8/2007 | Basu ........................ G06F 16/80 709/246 |
| 2007/0180148 A1 | 8/2007 | Yadidian |
| 2007/0206221 A1 | 9/2007 | Wyler et al. |
| 2007/0208834 A1 | 9/2007 | Nanamura et al. |
| 2007/0288837 A1 | 12/2007 | Eaves et al. |
| 2008/0071857 A1 | 3/2008 | Lie |
| 2008/0077880 A1 | 3/2008 | Oygard |
| 2008/0082821 A1* | 4/2008 | Pritikin ................. G06F 40/174 713/169 |
| 2008/0178098 A1 | 7/2008 | Yoon et al. |
| 2008/0256485 A1 | 10/2008 | Krikorian |
| 2008/0288515 A1 | 11/2008 | Kim et al. |
| 2009/0013085 A1 | 1/2009 | Liberman Ben-Ami |
| 2009/0064020 A1 | 3/2009 | Morris |
| 2009/0187574 A1 | 7/2009 | Kim et al. |
| 2009/0286560 A1* | 11/2009 | Willis ................... G06F 16/683 707/999.107 |
| 2010/0192185 A1 | 7/2010 | Margulis |
| 2011/0014934 A1 | 1/2011 | Rybak et al. |
| 2011/0077032 A1 | 3/2011 | Correale et al. |
| 2012/0054593 A1 | 3/2012 | Naderi |
| 2013/0246795 A1 | 9/2013 | Shinde et al. |

FOREIGN PATENT DOCUMENTS

| | | |
|---|---|---|
| GB | 2354854 A | 4/2001 |
| KR | 1020070119151 A | 12/2007 |
| WO | 0186462 A1 | 11/2001 |
| WO | 2004109557 A1 | 12/2004 |
| WO | 2008098174 A1 | 8/2008 |
| WO | 2008141424 A1 | 11/2008 |

OTHER PUBLICATIONS

Berners-Lee, T.; "Hypertext Markup Language—2.0"; RFC: 1866; Nov. 1995; 65 pages.
Proxoft L.L.C.; "Products—Cookie Editor"; Apr. 10, 2008; www.proxoft.com; 2 pages.
Van Geijtenbeek, Rijk,; "Re: Way to Re-Open (while in opera) in IE?"; Opera Software ASA; Nov. 30, 2004; 1 page.
Mozdev.org; "ieview.mozdev.org"; Mar. 5, 2005; 6 pages.
Wittenburg, Kent, et al.; "Visual Focusing and Transition Techniques in a Treeviewer for Web Information Access"; IEEE; 1997; 8 pages.
Maone Giorgio; "The NoScript Firefox Extension"; Inform Action Open Source Software; NoScript.net; Oct. 27, 2007; 23 pages.
Mills, Chris; "Differences Between Opera Mini 3 and 4"; Opera; Nov. 7, 2007; 4 pages.
OMA; "Nokia Announces the Nokia WAP Browser"; Jun. 30, 1999; 3 pages.
Rick, Editor in Chief, GameCubicle; "Nintendo DS Fact Sheet"; Aug. 2004; GameCubicle.com; 2 pages.
Nintendo of America Inc.; "Nintendo DS Browser Instruction Booklet"; 2006; 30 pages.
International Business Machines Corporation; "Notebook Views Within Web Pages"; Research Disclosure Database No. 433111; May 2000; 2 pages.
Heitmeyer, David P.; "CSCI E-153, Web Development Using XML"; Dec. 12, 2006; 40 pages.
Microsoft; "Microsoft Computer Dictionary, Fifth Edition"; Microsoft Press; 2002; 9 pages.
EPA; "Environmental Information Exchange Network & Grant Program Glossary"; Mar. 28, 2008; 7 pages.
Braemoor; "JavaScript Credit Card Validation Function"; Oct. 1, 2007; 10 pages.
Prasad, H.; "TextBox Validation"; C# Help; Nov. 18, 2007; 2 pages.
International Business Machines Corporation; "Web Site Substitution"; Research Disclosure Database No. 421083; May 1999; 2 pages.
"The Ultimate White Pages"; http://www.theultimates.com/white/; Feb. 6, 2003; 3 pages.
Nintendo of America Inc.; "Nintendo DS Instruction Booklet"; 2005; 15 pages.
Opera; "Giving Gamers Two Windows to the Web: The Opera Browser for Nintendo DS"; Oslo, Norway; Feb. 15, 2006; 3 pages.
Oystr; "Oystr User Guide"; Kyocera Wireless Corp.; 2006; 64 pages.
Vander Veer, Emily; "JavaScript for Dummies, 4th Edition, Chapter 8: Creating Interactive Images"; Wiley Publishing,Inc.; 2005; 26 pages.
IBM; "A Multi-Browser Framework For Portal Solutions"; IP.com; IP.com No. IPCOM000022113D; Feb. 25, 2004; 4 pages.
Office Action dated Jan. 5, 2011; U.S. Appl. No. 12/016,248, filed Jan. 18, 2008; 21 pages.
Final Office Action dated May 10, 2011; U.S. Appl. No. 12/016,248, filed Jan. 18, 2008; 19 pages.
Office Action dated Jun. 12, 2014; U.S. Appl. No. 12/016,248, filed Jan. 18, 2008; 29 pages.
Final Office Action dated Oct. 20, 2014; U.S. Appl. No. 12/016,248, filed Jan. 18, 2008; 18 pages.
Advisory Action dated Jan. 5, 2015; U.S. Appl. No. 12/016,248, filed Jan. 18, 2008; 2 pages.
Office Action dated Apr. 11, 2016; U.S. Appl. No. 12/016,248, filed Jan. 18, 2008; 23 pages.
Final Office Action dated Oct. 17, 2016; U.S. Appl. No. 12/016,248, filed Jan. 18, 2008; 38 pages.
Advisory Action dated Dec. 20, 2016; U.S. Appl. No. 12/016,248, filed Jan. 18, 2008; 3 pages.
Office Action dated Jun. 30, 2017; U.S. Appl. No. 12/016,248, filed Jan. 18, 2008; 26 pages.
Final Office Action dated Jan. 5, 2018; U.S. Appl. No. 12/016,248, filed Jan. 18, 2008; 27 pages.
Advisory Action dated Apr. 5, 2018; U.S. Appl. No. 12/016,248, filed Jan. 18, 2008; 2 pages.
Office Action dated Sep. 10, 2018; U.S. Appl. No. 12/016,248, filed Jan. 18, 2008; 31 pages.
Final Office Action dated Apr. 16, 2019; U.S. Appl. No. 12/016,248, filed Jan. 18, 2008; 36 pages.
Advisory Action dated Jul. 30, 2019; U.S. Appl. No. 12/016,248, filed Jan. 18, 2008; 3 pages.
Office Action dated Apr. 3, 2020; U.S. Appl. No. 12/016,248, filed Jan. 18, 2008; 10 pages.
Final Office Action dated Sep. 21, 2020; U.S. Appl. No. 12/016,248, filed Jan. 18, 2008; 11 pages.
Advisory Action dated Nov. 27, 2020; U.S. Appl. No. 12/016,248, filed Jan. 18, 2008; 2 pages.
Notice of Allowance dated Jun. 24, 2021; U.S. Appl. No. 12/016,248, filed Jan. 18, 2008; 17 pages.
European Extended Search Report; Application No. 08150416.9; dated Jul. 16, 2008; 6 pages.
European Examination Report; Application No. 08150416.9; dated Mar. 10, 2015; 7 pages.
European Extended Search Report; Application No. 09178569.1; dated Mar. 3, 2010; 10 pages.

(56) References Cited

OTHER PUBLICATIONS

European Extended Search Report; Application No. 09178568.3; dated Mar. 18, 2010; 8 pages.
European Extended Search Report; Application No. 10158517.2; dated Jun. 28, 2010; 8 pages.
European Extended Search Report; Application No. 08748301.2; dated Dec. 30, 2010; 9 pages.
Canadian Office Action; Application No. 2,649,959; dated Nov. 18, 2011; 3 pages.
Canadian Office Action; Application No. 2,649,959; dated Mar. 15, 2013; 3 pages.
Chinese Office Action; Application No. 200910130786.8; dated Oct. 19, 2011; 10 pages.
Chinese Office Action; Application No. 200910130786.8; dated Jul. 12, 2012; 17 pages.
Chinese Office Action; Application No. 200910130786.8; dated Feb. 17, 2013; 16 pages.
Indian Office Action; Application No. 113/CHE/2009; dated Dec. 9, 2013; 2 pages.
Indian Office Action; Application No. 113/CHE/2009; dated May 29, 2014; 1 page.
Indian Office Action; Application No. 113/CHE/2009; dated Sep. 1, 2014; 2 pages.

* cited by examiner

SYSTEM AND METHOD FOR NETWORK INTERACTION BETWEEN COMPUTING DEVICES

CROSS-REFERENCE TO RELATED APPLICATIONS

This application is a continuation of U.S. patent application Ser. No. 12/016,248 filed Jan. 18, 2008 by Sang-Heun Kim, et al. entitled, "System and Method for Network Interaction Between Computing Devices", which is incorporated by reference herein as if reproduced in its entirety.

FIELD

The present specification relates generally to communication and more specifically relates to a system and method for network interaction between computing devices.

BACKGROUND

Computing devices are becoming smaller and increasingly utilize wireless connectivity. Examples of such computing devices include portable computing devices that include wireless network browsing capability as well as telephony and personal information management capabilities. The smaller size of such client devices necessarily limits their display capabilities. Furthermore the wireless connections to such devices typically have less bandwidth than corresponding wired connections. The Wireless Application Protocol ("WAP") was designed to address such issues, but WAP can still provide a very unsatisfactory experience or even completely ineffective experience, particularly where the small client device needs to effect a secure connection with web-sites that host web-pages that are optimized for full traditional desktop browsers.

DESCRIPTION

Figure 1:
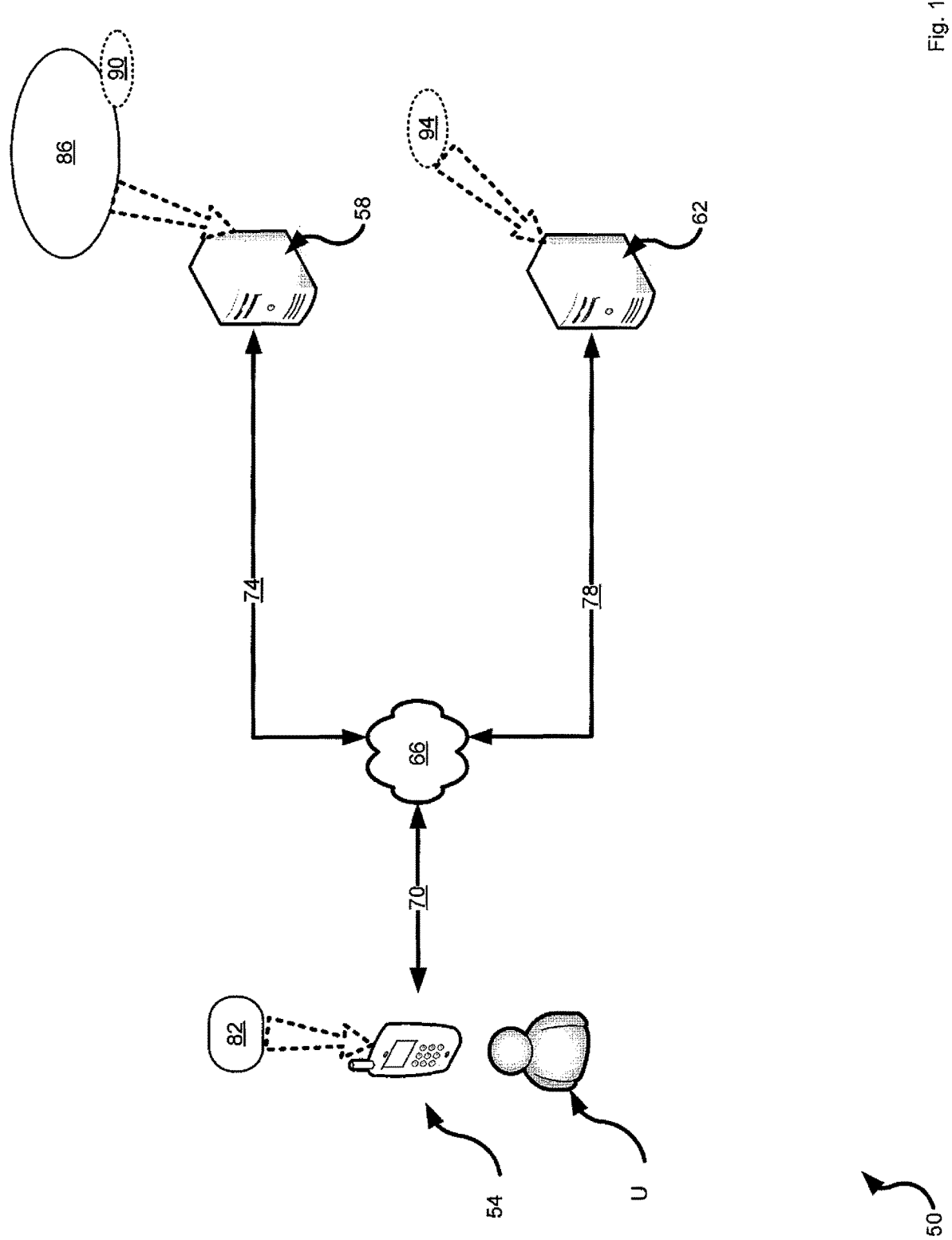
FIG. 1 is schematic representation of a system for network interaction between computing devices.

An aspect of the specification provides a system for network interaction between computing devices comprising a network and a first computing device configured to communicate over the network. The at least one additional computing device is also configured to communicate over the network and to provide interactive content. The first computing device is configured to access the interactive content. The interactive content includes at least one field that can receive input from the first computing device. The field has an input parameter. The at least one additional computing device is configured to provide a schema corresponding to the interactive content and to identify the input parameters The interactive content can include at least two fields, and each of the fields can have different input parameters.

The first computing device can be configured access the schema.

The first computing device can be configured to render the interactive content on the first computing device using the schema.

The first computing device can be further configured to verify that input provided to each of the at least two fields conforms with the parameters.

The interactive content can be secure interactive content and the first computing device can be configured to access the secure interactive content via a secure connection. The secure connection can be carried by hypertext transfer protocol over secure socket layer.

The interactive content can be a web-page including interactive fields.

The fields can comprise information for completing a product order, including a name, an address, and an account number. The fields can further comprise a credit card type and the account number can be a credit card number. The parameter for the credit card type can comprise a selection of one of a plurality of known credit card types and the parameter for the account number can correspond to a known number format respective to the credit card type.

The at least one additional computing device can comprise a second computing device for hosting the content and a third computing device for hosting the schema. The first computing device can be configured with a network address for the third computing device. The third computing device can host a plurality of signatures for different interactive contents.

The network can comprise the Internet.

The content that is in a web-page format can be configured for a full web-browser and the first computing device can comprise a mini-browser.

The first computing device can be a mobile electronic device with the combined functionality of a personal digital assistant, cell phone, email paging device, and a web-browser.

Another aspect of the present specification provides a first computing device in accordance with the first computing device according to any of the foregoing.

Another aspect of the present specification provides at least one additional computing device according to any of the foregoing.

Another aspect of the present specification provides a first a method for network interaction between computing devices comprising: receiving interactive content at a first computing device from at least one additional computing device; the interactive content can include at least one field that can receive input from the first computing device; the field has an input parameters; receiving a schema for the interactive content at the first computing device from the at least one additional computing device; the schema identifying the input parameters; rendering the interactive content on the first computing device using the schema.

The interactive content can include at least two fields, and each of the fields can have different input parameters.

The method can further include receiving input within the fields at the first computing device.

The method can further include verifying that input provided to each of the at least two fields conforms with the parameters.

Another aspect of the specification comprises a computer readable medium configured to maintain programming instructions in accordance with any of foregoing.

The present specification provides, amongst other things, a method and system for network interaction between computing devices. In one embodiment a wireless client machine is provided that includes a mini web-browser that is configured to access a secure web-page from a web-server. The secure web-page includes an interactive form. The wireless client machine is also configured to access a schema that corresponds to the secure web-page. The wireless client machine is configured to render the secure web-page using the contents of the schema.

Referring now to FIG. 1, a system for network interaction between computing devices is indicated generally at 50. In a present embodiment system 50 comprises a first computing device in the form of a client machine 54 and a second computing device in the form of a web server 58, and a third computing device in the form of a schema server 62. A network 66 interconnects each of the foregoing components.

Each client machine 54 is typically any type of computing or electronic device that can be used to interact with content available on network 66. Each client machine 54 is operated by a user U. Interaction includes displaying of information on client machine 54 as well as to receive input at client machine 54 that is in turn sent back over network 66. In a present embodiment, client machine 54 is a mobile electronic device with the combined functionality of a personal digital assistant, cell phone, email paging device, and a web-browser. Such a mobile electronic device thus includes a keyboard (or other input device(s)), a display, a speaker, (or other output device(s)) and a chassis within which the keyboard, display monitor, speaker are housed. The chassis also houses one or more central processing units, volatile memory (e.g. random access memory), persistent memory (e.g. Flash read only memory) and network interfaces to allow machine 54 to communicate over network 66.

Web server 58 and schema server 62 (which can, if desired, be implemented on a single server) can be based on any well-known server environment including a module that houses one or more central processing units, volatile memory (e.g. random access memory), persistent memory (e.g. hard disk devices) and network interfaces to allow servers 58 and 62 to communicate over network 66. For example, server 58 or server 62 or both can be a Sun Fire V480 running a UNIX operating system, from Sun Microsystems, Inc. of Palo Alto Calif., and having four central processing units each operating at about nine-hundred megahertz and having about sixteen gigabytes of random access memory. However, it is to be emphasized that this particular server is merely exemplary, and a vast array of other types of computing environments for servers 58 and 62 are contemplated.

It should now be understood that the nature of network 66 and the links 70, 74 and 78 associated therewith is not particularly limited and are, in general, based on any combination of architectures that will support interactions between client machine 54 and servers 58 and 62. In a present embodiment network 66 itself includes the Internet as well as appropriate gateways and backhauls to links 70, 74 and 78. Accordingly, the links 70, 74 and 78 between network 66 and the interconnected components are complementary to functional requirements of those components.

More specifically, system 50 includes link 70 between client machine 54 and network 66, link 70 being based in a present embodiment on core mobile network infrastructure (e.g. Global System for Mobile communications ("GSM"); Code Division Multiple Access ("CDMA"); CDMA 2000; 3G) or on wireless local area network ("WLAN") infrastructures such as the Institute for Electrical and Electronic Engineers ("IEEE") 802.11 Standard (and its variants) or Bluetooth or the like or hybrids thereof. Note that in an exemplary variation of system 50 it is contemplated that client machine 54 could be other types of client machines whereby link 70 is a wired connection.

System 50 also includes link 74 which can be based on a T1, T3, O3 or any other suitable wired or wireless connection between server 58 and network 66. System 50 also includes link 78 which can be based on a T1, T3, O3 or any other suitable wired or wireless connection between server 62 and network 66.

As previously stated, client machine 54 is configured to interact with content available over network 66, including web content on web server 58. In a present embodiment, client machine 54 effects such interaction via a web-browser 82 that is configured to execute on client machine 54. As will be explained further below, web-browser 82 is a mini-browser in the sense that it is configured to re-render web-pages on the relatively small display of client machine 54, and during such re-rendering attempt to render those pages in a format that conveys information, as much as possible, substantially in the same manner as if those web-pages had been rendered on a full browser such as Internet Explorer or Firefox on a traditional desktop or laptop computer. Web server 58 is configured to host a web-site 86 that includes, in a present embodiment, a secure web-page 90. The non-secure portions of web-site 86 can be based on the Hypertext Transfer Protocol ("HTTP") while secure web-page 90 can be based on, for example, the HTTP over Secure Socket Layer ("SSL") ("HTTPS") protocol. By the same token web-browser 82 will be equipped to access and interact with both web-page 86 and secure web-page 90.

Figure 2:
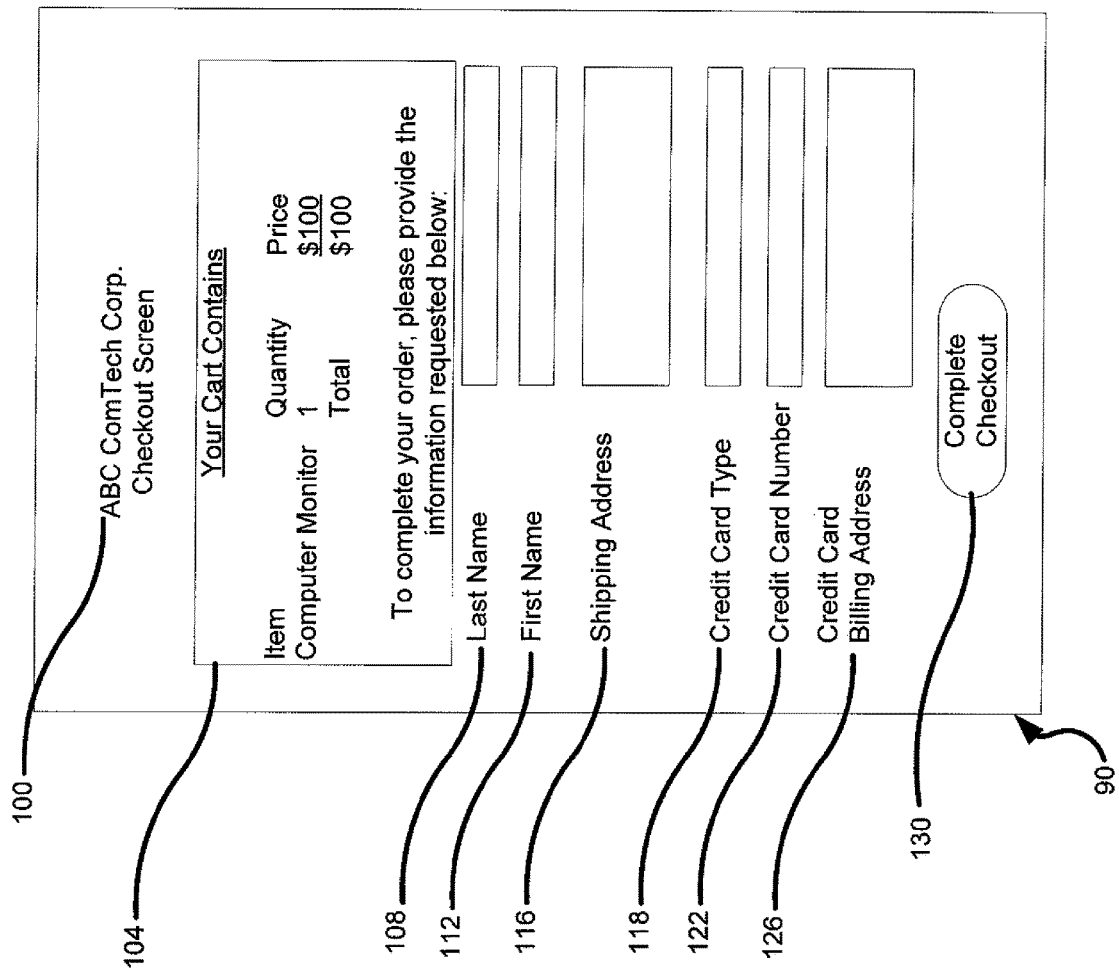
FIG. 2 shows an exemplary secure web-page hosted by the web-server in FIG. 1.

FIG. 2 shows an exemplary representation of a secure web-page 90. The representation in FIG. 2 shows how secure web-page 90 would be rendered on a traditional desk-top computer such as a Windows-based computer running the Internet Explorer or Firefox Web-browser as an HTTPS web-page. In the example, web-site 86 is an e-commerce web-site belonging to a fictional computer equipment retailer named ABC ComTech Corp. Web-site 86 can be browsed to select various computer equipment items for purchase, culminating in the selection of secure web-page 90 which is a checkout screen that can be used to complete the final order for the selected computer equipment and to provide payment and shipping information therefor. Due to security concerns, secure web-page 90 is therefore provided via the HTTPS protocol in order to protect the privacy of the purchaser and reduce the likelihood of identity theft. Thus, secure web-page 90 includes a plurality of fields including:

1) a title field 100 that identifies the equipment retailer and identifies web-page 90 as a checkout screen;

2) a shopping cart field 104 that identifies the equipment that has been selected for purchase and the total cost thereof;

3) a last name field 108 which is interactive and can receive input that identifies the buyer;

4) a first name field 112 which is interactive and can receive input that identifies the buyer;

5) a shipping address field 116 which is interactive and can receive input that identifies the shipping address of the equipment identified in field 104;

6) a credit card type field 118 which is interactive and can receive input identifying the type of credit card (e.g. VISA™, Mastercard™) being used to purchase the equipment identified in field 104;

7) a credit card number field 122 which is interactive and can receive input identifying a credit card belonging to the entity identified in fields 108 and 112 and corresponds to the type identified in field 118;

8) a credit card billing address field 126 which is interactive and can receive input identifying the address to which bills for the credit card identified in credit card field 122 are sent;

9) a "complete checkout" button 130 which can be selected once fields 108-126 have been completed.

Note that it is common for interactive fields 108-126 to be constrained so that only certain types of input are permitted. For example, credit card number field 122 can be constrained to only permit digits, and can be further constrained to require a certain number of digits that correspond to an expected number of digits for a credit card corresponding to the credit card type identified in credit card type field 118. In addition, it is common in a traditional desktop browser scenario that the selection of button 130 the resulting page will be sent to server 86 and will lead to a verification process by server 86 that the data entered in fields 108-126 conforms with certain requirements—in the simplest example the verification process on server 86 will ensure that all fields 108-126 were actually completed, and a more complex verification process server 86 will ensure that fields were completed according to specific restrictions.

Those skilled in the art will now recognize that secure web-page 90 as shown in FIG. 2 and fields 100-130 are purely exemplary and that secure web-page 90 need not be constrained to the structure or appearance in FIG. 2.

Referring again to FIG. 1, in a present embodiment, web-browser 82 is also configured to interact with schema server 62 in order to obtain a schema 94.

In general, a schema such as schema 94 comprises a file corresponding secure website content such as secure web-page 90. A schema can contain instructions to identify each page family on the website (login, signup, etc.), as well as instructions to extract desired objects and elements for each page family. A schema can additionally specify the relationship between the objects and attributes (user login field is a global username field, user password field is a global password field), and provide user U the capability of completing secure transactions. Note that not all transactions need to be implemented for a schema to be complete.

Schema 94, which can be maintained in the form of an eXtended Markup Language ("XML") file, or the like, contains data which assists web-browser 82 to render secure web-page 90 on client machine 54. Table I shows an exemplary representation of a schema 94 that corresponds to secure web-page 90.

TABLE I

Exemplary content of schema 94 corresponding to exemplary secure web-page 90

| Field Name | Field Reference | Field Type | Parameters |
| --- | --- | --- | --- |
| Title Field | 100 | Non-interactive | Display contents only |
| Shopping Cart Field | 104 | Non-interactive | Display contents only |
| Last Name | 108 | Interactive | Name field; Text only |
| First Name | 112 | Interactive | Name field; Text only |
| Shipping Address | 116 | Interactive | Address Format; Mixed Numeric and Text; Requires: Street number; Street name; street type; city name; province or state; country; postal or zip code |
| Credit Card Type | 118 | Interactive | Menu List |
| Credit Card Number | 122 | Interactive | Credit Card Number; Numeric; Formation and Number of digits dependent on selection of Credit Card Type 118 |
| Credit Card Billing Address | 126 | Interactive | Address Format; Mixed Numeric and Text; Requires: Street number; Street name; street type; city name; province or state; country; postal or zip code |
| Checkout Complete | 130 | Interactive | Button indicating form is complete to submit form back to web server; If selected, ensure compliance with Parameters for Fields 108-126 prior to submitting form back to web server; if Parameters for Fields 108-126 are non-compliant then generate error message. |

Explaining Table I in greater detail, Field Name column corresponds to the field name in FIG. 2; the Field Reference column corresponds to the reference character in FIG. 2 and the respective field name. The Field Name and Field Reference are used by web-browser 82 to identify the various fields in secure-web-page 90. (It should be understood that the Field Name and Field Reference are actually encoded in secure web-page 90 and schema 94 in HTML format). The Field Type and Content Parameters columns of Table I are used by web-browser 82 to understand how the corresponding fields in FIG. 2 are to be treated by web-browser 82 when web-browser 82 renders those fields. (It should be understood that the Field Type and Content Parameters are actually encoded in schema 94 in a format that is usable by web-browser 82 during rendering of web-page 90).

Figure 3:
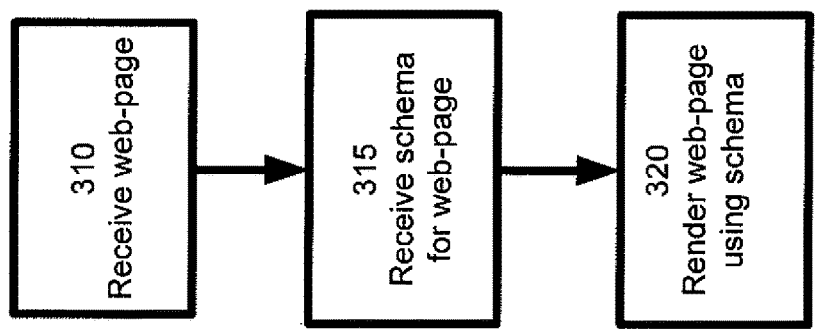
FIG. 3 shows a flow-chart depicting a method of network interaction between computing devices that can be performed on the system of FIG. 1.

Referring now to FIG. 3, a method for network interaction between two computers is represented in the form of a flow-chart as indicated generally at 300. Method 300 can be performed using system 50, though it is to be understood that method 300 can be performed on variations of system 50, and likewise it is to be understood that method 300 can be varied.

Figure 4:
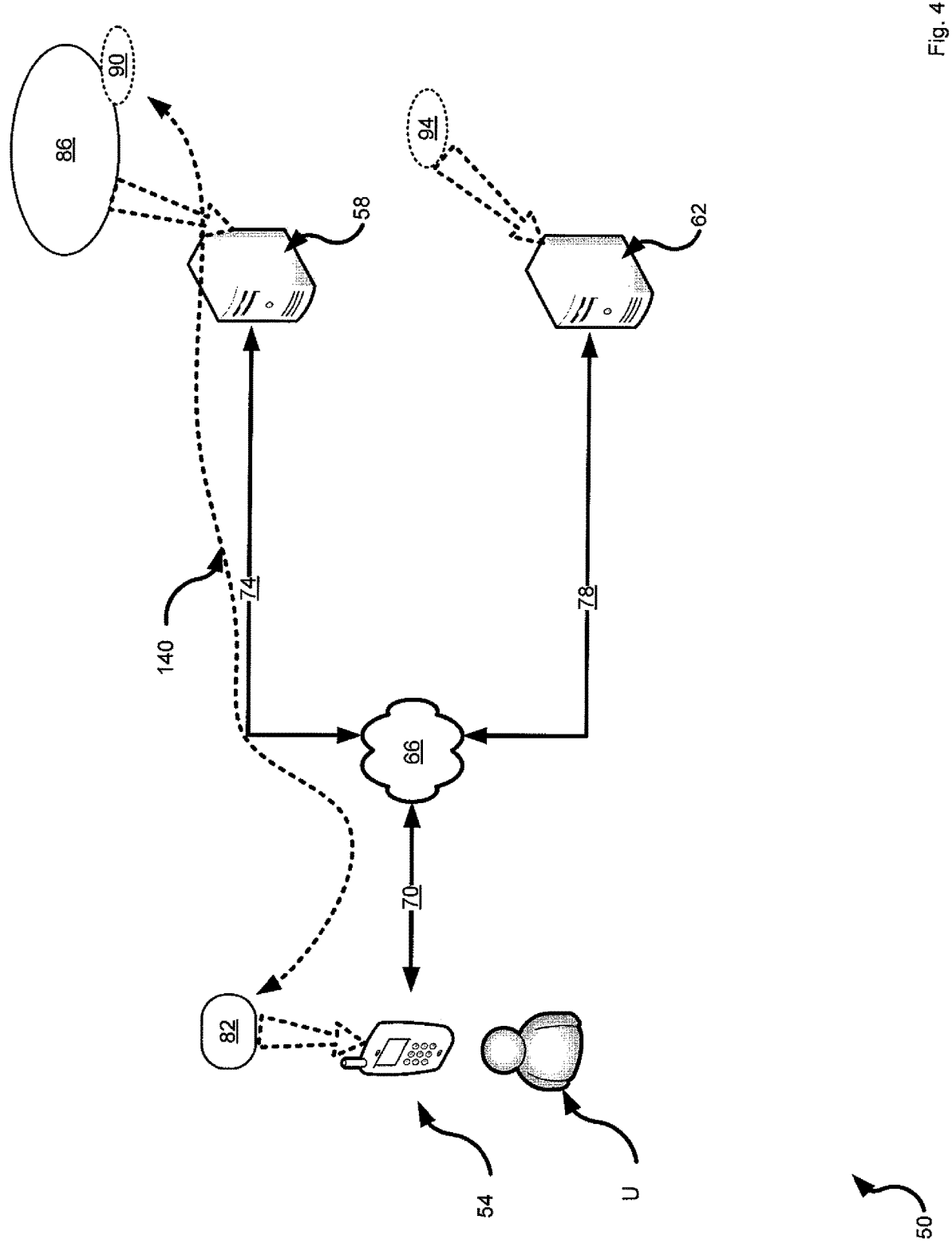
FIG. 4 shows the system of FIG. 1 during exemplary performance of part of the method in FIG. 3.

Beginning at block 310 a web-page is received. Performance of block 310 is represented in FIG. 4, wherein secure web-page 90 is shown as being carried over an HTTPS connection 140 via link 74, network 66 and link 70 to web-browser 82. At this point it can be noted that the contents of secure web-page 90 are requested from web-server 58 and delivered to client machine 54 in substantially the same manner as would be occur if client machine 54 were rendered on a full browser such as Internet Explorer or Firefox on a traditional desktop or laptop computer with full capabilities. Thus, the programmer of web-page 90 (and for that matter, web-site 86) need not take any steps to optimize secure web-page 90 for the relatively limited display and processing capabilities of client machine 54.

Figure 5:
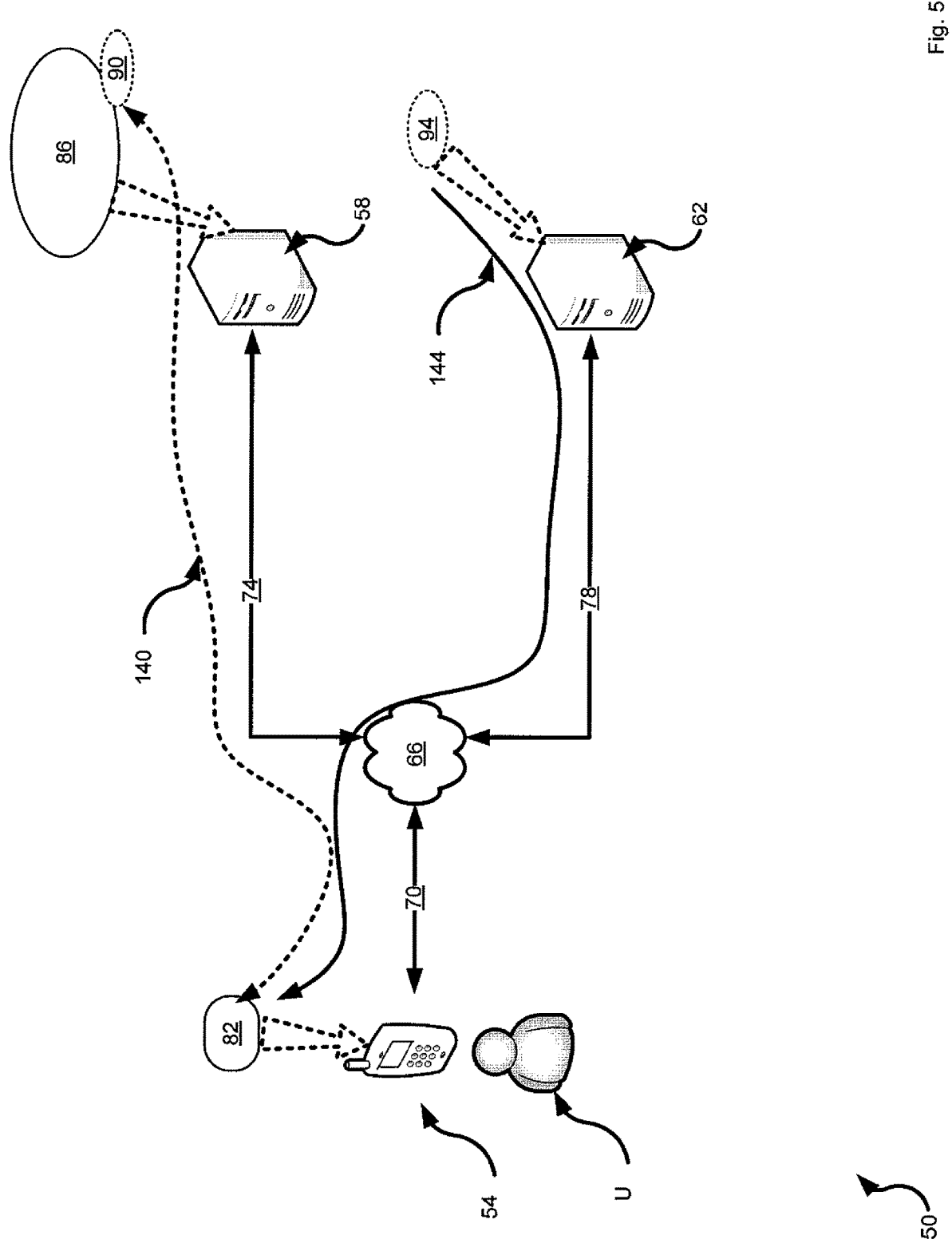
FIG. 5 shows the system of FIG. 1 during further exemplary performance of another part of the method in FIG. 3.

Referring again to FIG. 3, at block 315 a schema web-page is received. Performance of block 315 is represented in FIG. 5, wherein schema 94 is shown as being carried over a connection 144 via link 78, network 66 and link 70 to web-browser 82. Note that the nature of connection 144 is not particularly limited and can be based on any desired protocol.

Also note that the means by which web-browser 82 requests schema 94 is not particularly limited. In one particular embodiment, however, it is contemplated that web-browser 82 will be configured to automatically make network requests over network 66 to request a schema that corresponds to secure web-page 90. For example, schema server 62 can have a predefined network address on network 66 that is preprogrammed into client machine 54. The type of network address is not particularly limited, and can be, for example, any type of network identifier such as an Internet Protocol ("IP") address or a Uniform Resource Locator ("URL"). Any other suitable type of network address is contemplated. Client machine 54 can therefore be programmed to send a request to the address for schema server 62 and request that schema server 62 provide, if available, a schema (e.g. schema 94) that corresponds to secure web-page 90. The request provided by client machine 54 can be formed with any unique identifier for secure web-page 90, but in the context of the Internet the request would most typically be, or derived from, the URL associated with secure web-page 90. In turn, that unique identifier can be used to index schema 94 on schema server 62.

As well, authentication can be made through connection 144 to validate the origin of schema 94. For an example, private and public key based authentication can verify that schema 94 is originated from a trusted source.

Those skilled in the art will now recognize that system 50 can be implemented so that a plurality of secure web-pages (like secure web-page 90) are hosted over network 66 (either alone by server 58 or by a plurality of web servers like web server 58), and that a corresponding plurality of signatures for each of those secure web-pages can be maintained on schema server 62. Those skilled in the art will now recognize that there can in fact be a plurality of schema servers (like schema server 62) and that client machine 54 can be configured to search for corresponding schema files on one or more of those schema servers. Those skilled in the art will now further recognize that schema servers can be hosted by a variety of different parties, including, for example: a) a manufacturer client machine 54, b) a service provider that provides access to network 66 via link 70 on behalf of user U of client machine 54; or c) the entity that hosts web-site 86. In the latter example it can even be desired to simply host schema file 94 directly on web server 58 and thereby obviate the need for schema server 62.

Referring again to FIG. 3, at block 320 the web-page is rendered using the schema. In other words the web-page received at block 310 is rendered using the schema received at block 315. Block 320 is in the present example performed by web-browser 82 which renders secure web-page 90 using schema 94. Of particular note is that web-browser can utilize the Field Type and Parameters data in Table I in order to render fields 108-126 in an interactive format on the display of client machine 54 and ensure compliance with the Parameters as those interactive fields are used to receive input from user U of client machine 54.

Figure 6:
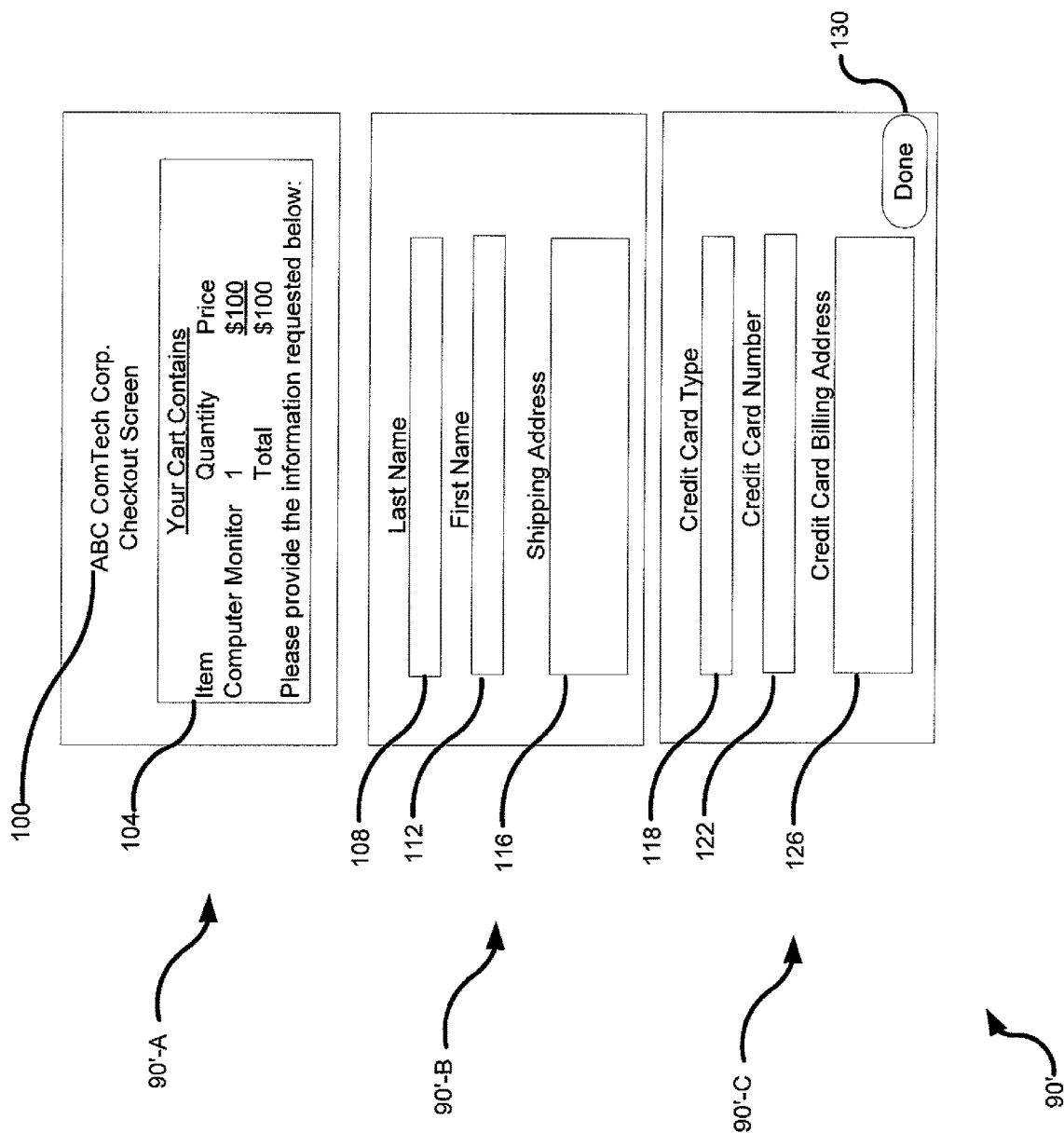
FIG. 6 shows the secure web-page of FIG. 2 as rendered on the client machine of FIG. 1 using the method of FIG. 3.

FIG. 6 shows exemplary performance of block 320, as secure web-page 90 is now shown in FIG. 6 as secure web-page 90' which consists of three separate screens 90'-A, 90'-B and 90'-C. As rendered on the display of client machine 54, user U input can be provided to scroll between each screen 90'-A, 90'-B and 90'-C. Likewise fields 108-126 can be completed on screens 90'-B and 90'-C and web-browser 82 will ensure compliance with the Parameters of Table I prior to accepting selection of the "Done" button 130 (equivalent to "Checkout complete" button 130). Also of note however, and not readily apparent from viewing FIG. 6 is that client machine 54, through web-browser 82, is now configured to require input to fields 108-126 that comply with the Parameters in Table I. For example, web-browser 82 will require that the credit card number field 122 will contain a sequence of digits that corresponds to an expected sequence of digits from a credit card type from the credit card type field 118. Such verification can therefore occur prior to actually sending the completed form back to web-server 58.

Various advantages will now be apparent. One result of the foregoing is that a developer of secure web-page 90 need only prepare a secure web-page 90 for rendering on a full web-browser without considering the limitations of mini-browser 82 and yet secure web-page 90 can still be rendered and used on client 54. Another result is that schema 94 can be created by any party in order extend the availability of web-page 90 onto a plurality of client machines 54 and thereby increase traffic to web-site 86. Another result of the foregoing is that the security of connection 140 between server 58 and client machine 54 is preserved throughout the performance of method 300, and thereby affording privacy to user U of client 54. This can be particularly important if, as might occur in the prior art, user U were to inadvertently enter in a credit card number into, for example, last name field 108 which (for whatever reason) was not configured to be sent back to web server 58 via secure connection 140 but over an insecure connection (not shown); in this scenario, not only would the transaction fail leading frustration for user U, but also user U's credit card would be sent over an insecure connection thereby exposing the credit card number to theft.

Figure 7:
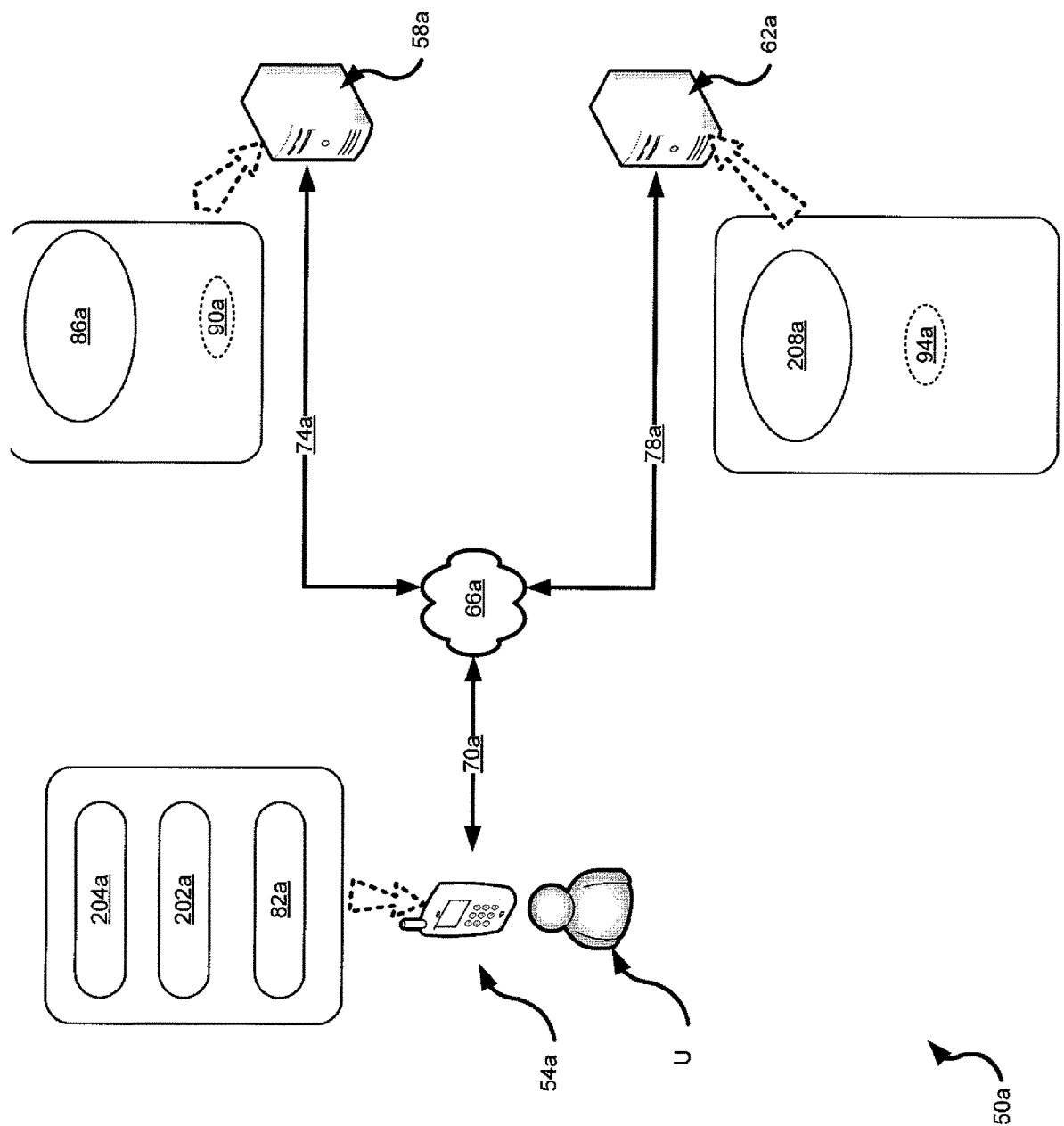
FIG. 7 shows another system for network interaction between computing devices.

Referring now to FIG. 7, a system for network interaction between computing devices in accordance with another embodiment is indicated generally at 50a. System 50a is a variant of system 50 and accordingly like elements in system 50a bear like reference characters to elements in system 50, except followed by the suffix "a". Of note however is that in system 50a client machine 54a includes, in addition to web-browser 82a, a transcoding engine 202a and a personal information database 204a. Transcoding engine 202a is configured to receive schema 94a and to use schema 94a in order to instruct web-browser 82a how to render web-page 90a on client machine 54a. Personal information database 204a includes personal information of user U, including, for example, at least one or more of login credentials, credit card information, gift card information. In general personal information database 204a includes information which should be kept secure during any interaction between client machine 54a and content available on network 66a. It should be understood that the term "personal information database" is used for convenience and that personal information database 204a is a data file that maintains those objects.

Figure 8:
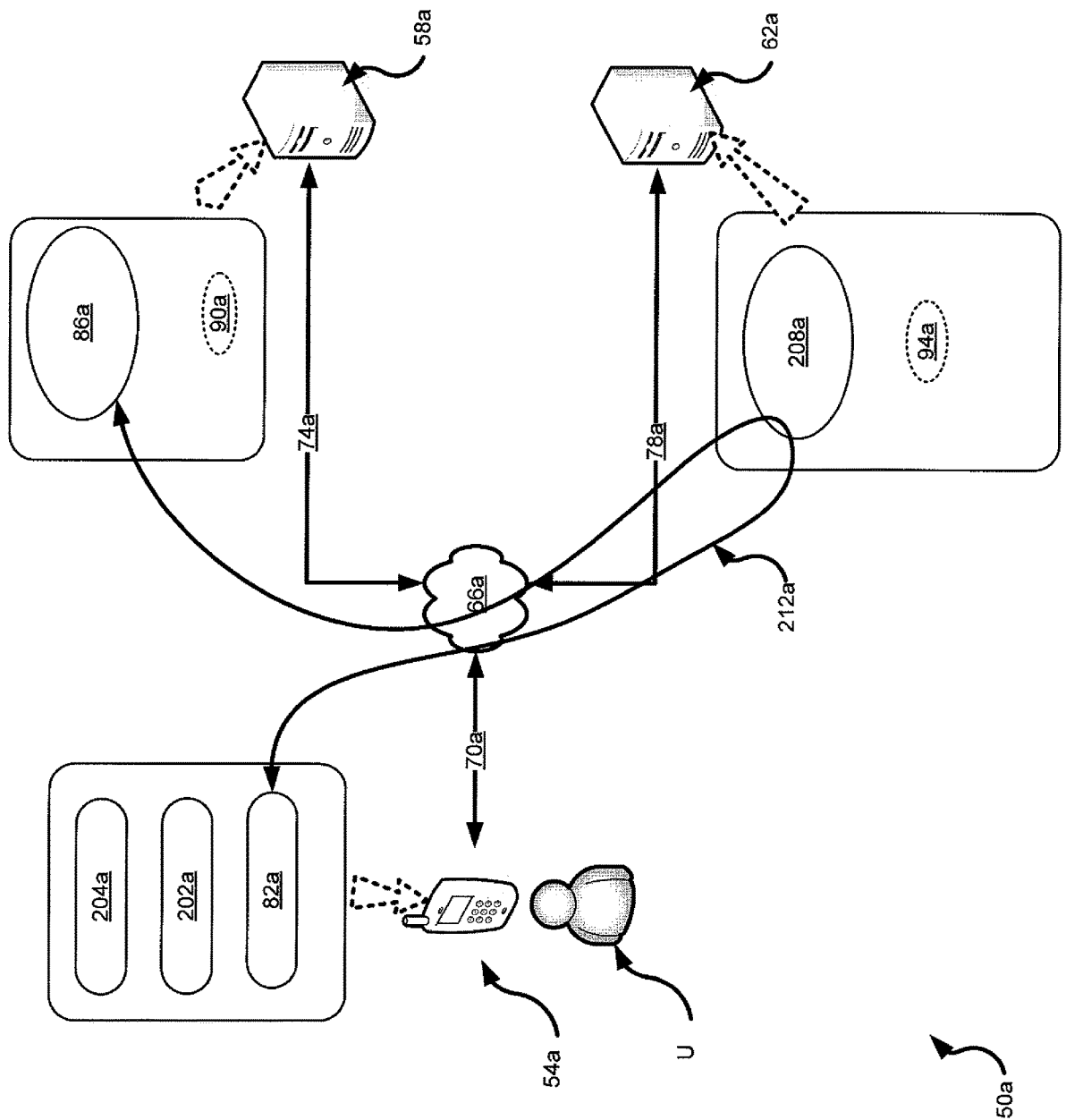
FIG. 8 shows the system of FIG. 1 with an exemplary connection.

Also of note in system 50a is that schema server 62a also includes a transcoding engine 208a. As best shown in FIG. 8, transcoding engine 208a is configured to intermediate traffic between web-browser 82a and non-secure portions of web-site 86a via connection 212a. Connection 212a itself can be a secure or non-secure connection, though typically would be non-secure in accordance with the non-secure portions of content on web-site 86a and thereby decrease overhead associated with connection 212a. Transcoding engine 208a is thus configured to, in substantially real-time, transcode non-secure portions of web-site 86a so that they are optimized on behalf of web-browser 82a for immediate display on client machine 54a. Thus, in this system 50a web-browser 82a is not configured to re-render the non-secure material on web-site 86a itself, but instead rely on transcoding engine 208a.

Figure 9:
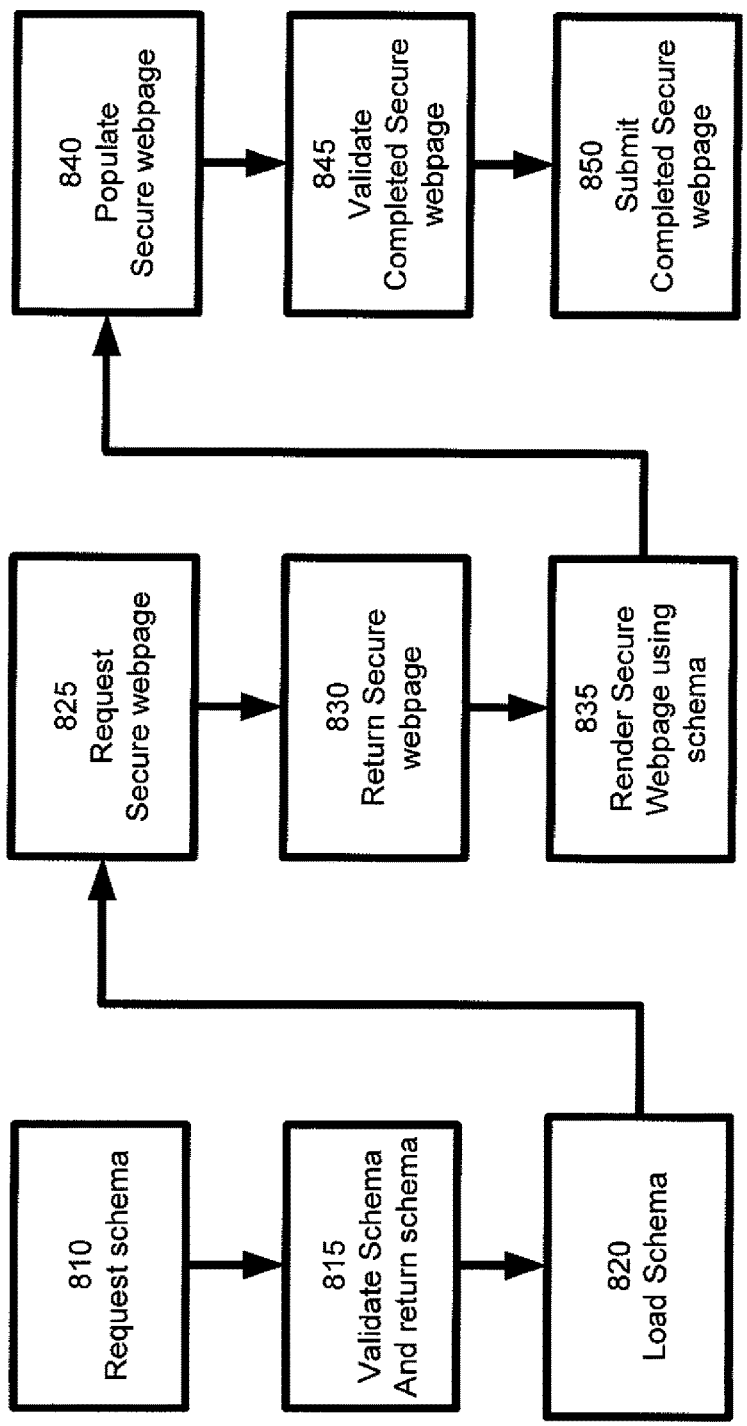
FIG. 9 shows a flow-chart depicting a method of network interaction between computing devices that can be performed on the system of FIG. 7.

Assume, while referring to FIG. 8, that such non-secure portions of web-site 86a reflect various computer equipment items for that can be browsed for purchase (consistent with the example relative to web-site 86 of system 50) via a secure checkout page associated with secure web-page 90a. System 50a can therefore also be used to effect a secure web-checkout using secure web-page 90a. Referring now to FIG. 9, a method for network interaction is represented in the form of a flow-chart as indicated generally at 800. Method 800 can be performed using system 50a, though it is to be understood that method 800 can be performed on variations of system 50, and likewise it is to be understood that method 800 can be varied. Indeed, those skilled in the art will now recognize that method 800 is a variation of method 300.

Figure 10:
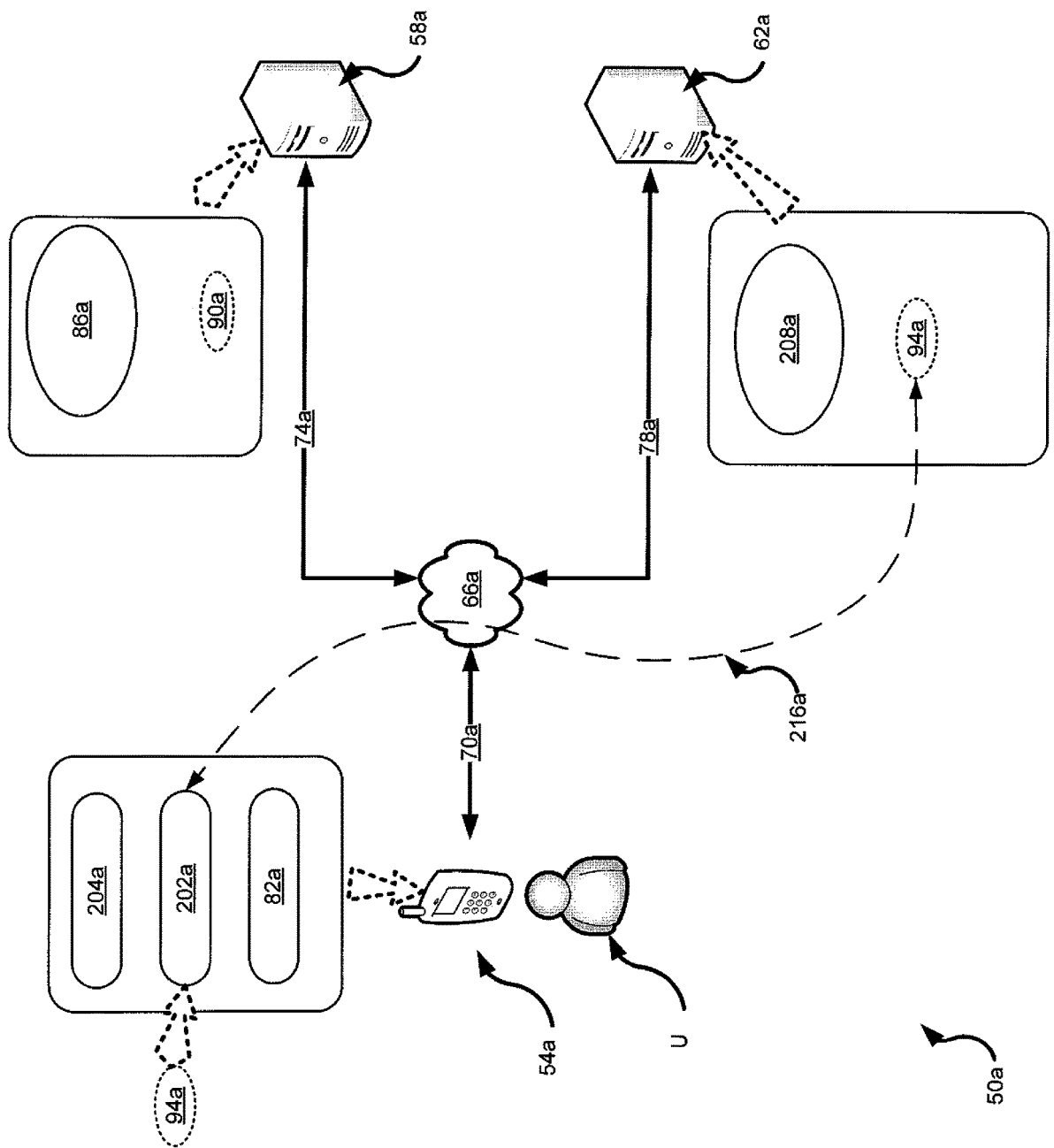
FIG. 10 shows the system of FIG. 7 during exemplary performance of part of the method in FIG. 9.

At block 810 a schema is requested. Block 810 is performed by transcoding engine 202a, which establishes a connection with schema server 62a in order to retrieve schema 94a. At block 815a the schema is validated and returned. The validation of block 815a (which, it will be appreciated, like certain other aspects of method 800, will be understood to be optional) can be effected by server 62a which can perform a validation operation to confirm that signature 94a matches secure web-site 90a and is otherwise up-to-date. If validation is not achieved then an exception (e.g. an error) can be generated. Assuming validation is achieved, then schema 94a is returned to transcoding engine 202a. At block 820, the schema is loaded. In the present example the schema is loaded into transcoding engine 202a. Blocks 810 through 820 are represented in FIG. 10, as a secure connection between transcoding engine 202a of client machine 54a and schema 94a of server 82a is indicated at reference 216a such that schema 94a is now loaded onto client machine 54a and available to transcoding engine 202a.

Figure 11:
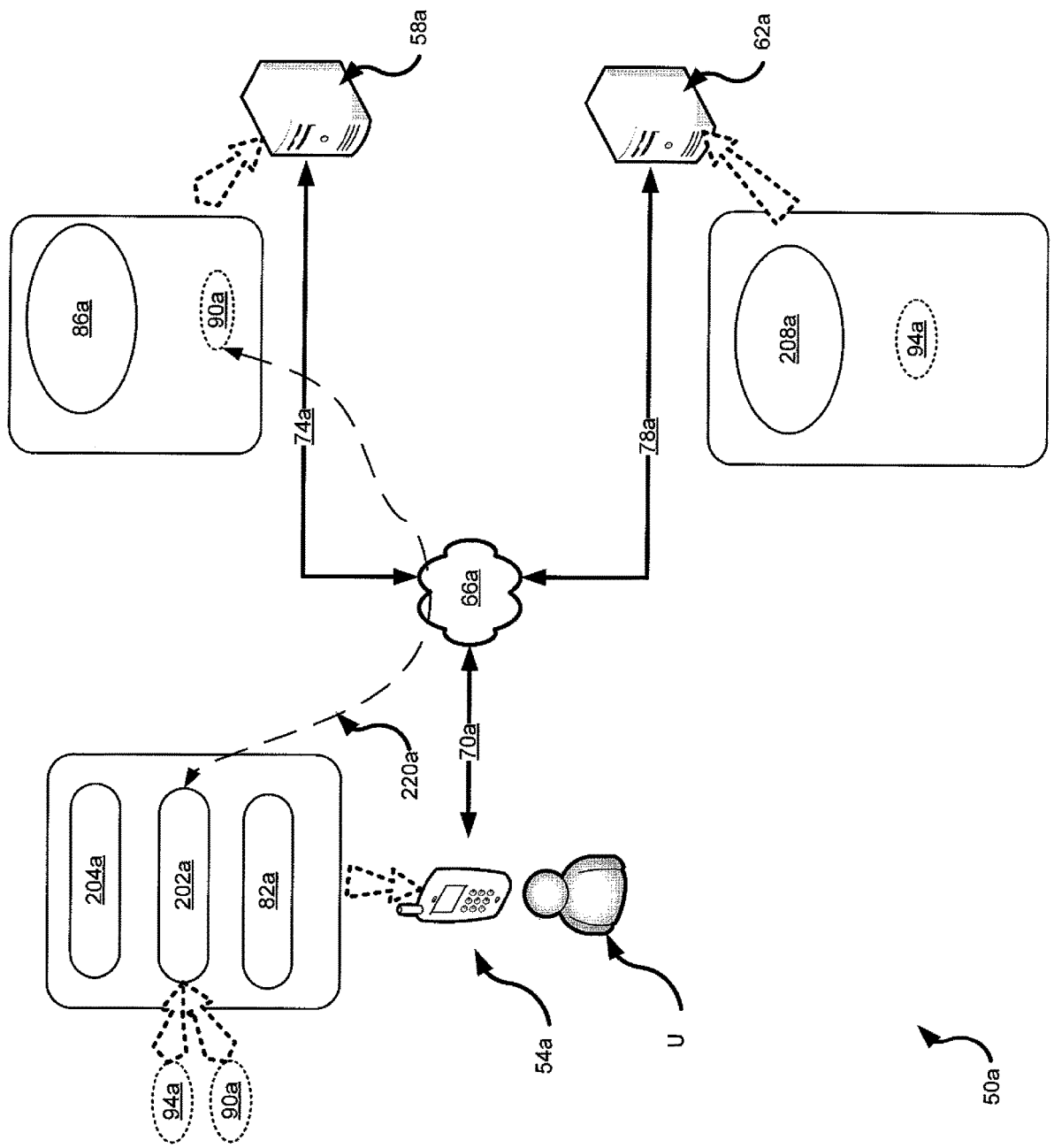
FIG. 11 shows the system of FIG. 7 during further exemplary performance of part of the method in FIG. 9.

Referring again to FIG. 9, at block 825 a secure web-page is requested. In this embodiment, transcoding engine 202a makes a direct request for secure web-page 90a, bypassing server 62a. At block 830, the secure web-page is returned. More particularly, web server 58a returns web-page 90a to transcoding engine 202a. Blocks 825 and 830 are represented in FIG. 11 as a secure connection between transcoding engine 202a and secure web-page 90a is indicated at 220a such that secure web-page 90a is now loaded onto client machine 54a and available to transcoding engine 202a.

Figure 12:
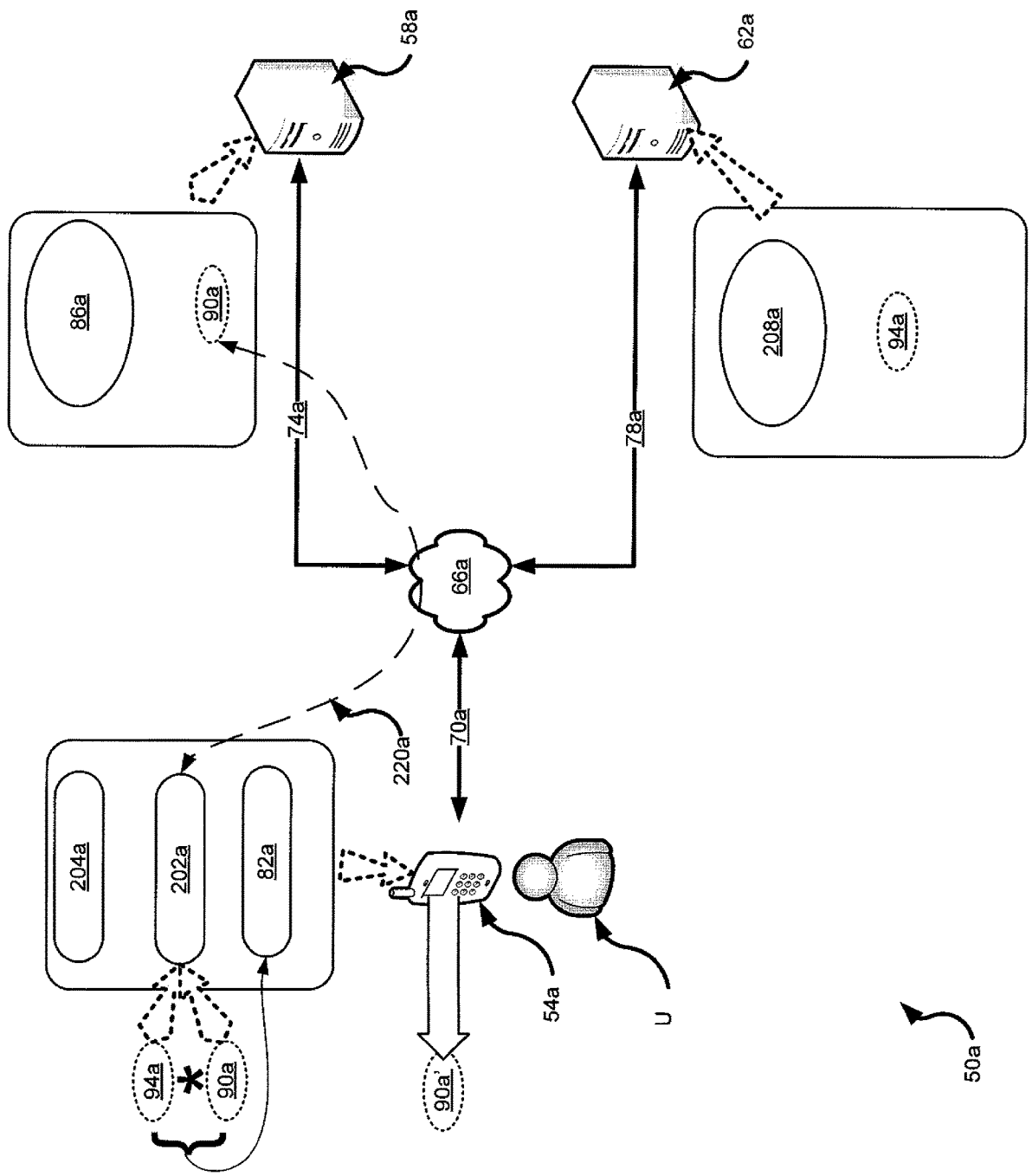
FIG. 12 shows the system of FIG. 7 during further exemplary performance of part of the method in FIG. 9.

Referring again to FIG. 9, at block 835 the secure web-page is rendered using the schema. In this embodiment, transcoding engine 202a makes use of the data contained in schema 94a in order to pass a transcoded version of secure web-page 90a so that secure web-page 90a can be rendered using web-browser 82a in accordance with the parameters prescribed by schema 94a. Block 835 is represented in FIG. 12, as transcoded secure web-page 90a' is shown being rendered by web-browser 82a based on a transcoding operation performed by transcoding engine 202a utilizing schema 94a and secure web-page 90a.

Referring again to FIG. 9, at block 840, the secure web-page is populated. In this embodiment, user U provides input to keyboard (or other input device), completing form-fields on transcoded secure web-page 90a' of client machine 54a in accordance with the interactive parameters that have been provided by schema 94a. Where those credentials are maintained within personal information database 204a, web-page 90a' can be automatically populated. then At block 845, the now-completed transcoded secure web-page 90a' is validated. Block 845 can be performed during completion of web-page 90a' or upon receiving input indicating that user U is done completing web-page 90a' or both.

At block 850, the completed secure web-page is submitted. In this embodiment, once validation has occurred, transcoding engine 202a will return the completed version of web-page 90a' to web-server 58 via secure connection 220a.

Figure 13:
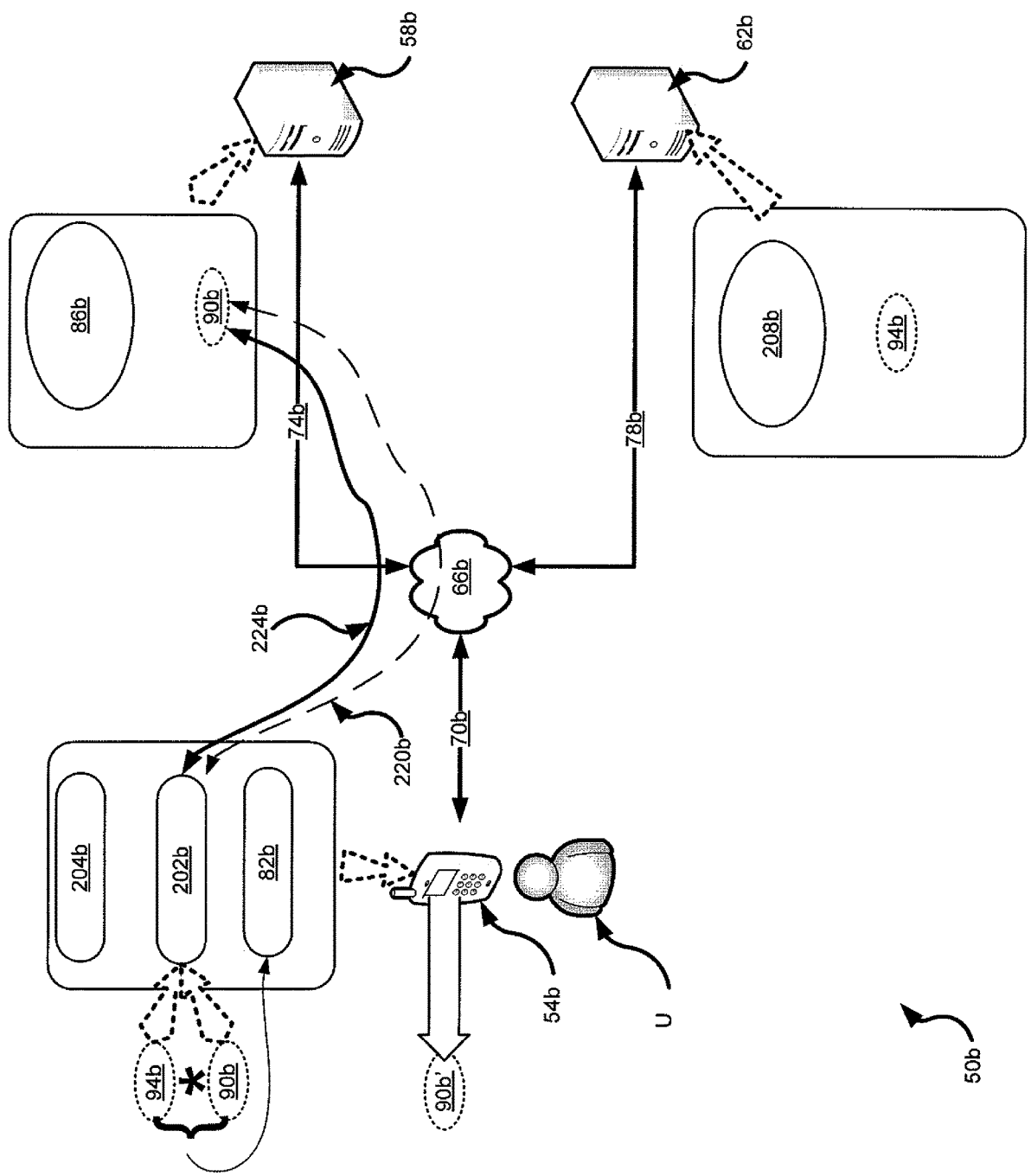
FIG. 13 shows another system for network interaction between computing devices.

Referring now to FIG. 13, a system for network interaction between computing devices in accordance with another embodiment is indicated generally at 50b. System 50b is a variant of system 50a and accordingly like elements in system 50b bear like reference characters to elements in system 50, except followed by the suffix "b". Of note however is that in system 50b there is not only a secure connection 220b corresponding to secure connection 220a, but there is also a non-secure connection 224b that is associated with web-page 90b (which may be implemented as a plurality of web-pages, or not, according to the technology employed). It is contemplated that certain fields where security is not considered important (e.g. shipping address field 116) may be carried over non-secure connection 224b, whereas fields where security is considered important (e.g. credit card number field 122) would be carried over secure connection 220b. Schema 94b therefore can ensure that, when transcoded web-page 90b' is rendered on the client machine 54b that user U does not inadvertently put user U's credit card number in shipping address field 116 and thereby risk exposing that credit card number to inception over non-secure connection 224. Alternatively, the non-secure fields can be carried in a connection similar to connection 212a.

Further enhancements and variations will now occur to those skilled in the art. For example, cookies can be employed between web-browser 82a and web server 58a to provide state to the stateless protocol HTTP. Furthermore, other HTTP headers may also provide instructions for the browser (character encoding, caching, etc. . . . ). Transcoding engine 202a need not alter the HTTP header in any fashion. Therefore processing of cookies and other HTTP headers can be provided by web-browser 82a, and not altered by server 62a.

The foregoing presents certain exemplary embodiments, but variations or combinations or subsets thereof are contemplated.

The invention claimed is:

1. A computing device comprising:
   a memory;
   a processor coupled to the memory, wherein the memory stores instructions that when executed by the processor cause the processor to perform the functions of:
   communicating over a network;
   receiving, from a web server, interactive content comprising at least one secured field to receive a first input and at least one unsecured field to receive a second input;
   receiving the first input in the at least one secured field;
   receiving the second input in the at least one unsecured field;
   determining that the at least one secured field requires a secure connection with the web server;
   determining that the at least one unsecure field utilizes an unsecure connection with the web server;
   transmitting, using the secure connection, the first input to the web server; and
   transmitting, using the unsecure connection, the second input to the web server.

2. The computing device of claim 1, wherein the interactive content is secure interactive content received via a secure connection.

3. The computing device of claim 1, wherein the interactive content is a web-page including interactive fields.

4. The computing device of claim 1, wherein the secure connection is carried by hypertext transfer protocol over a secure sockets layer session.

5. The computing device of claim 1, wherein the at least one unsecured field comprises information for completing a product order, wherein the information for completing a product order comprises at least one of a name, an address, or an account number.

6. The computing device of claim 1, wherein the at least one secured field is credit card information including a credit card type and a credit card account number.

7. The computing device of claim 6, wherein a first input parameter includes a first portion for the credit card type comprising a selection of one of a plurality of known credit card types, and wherein the first input parameter further includes a second portion for the credit card account number corresponding to a known number format respective to the credit card type.

8. The computing device of claim 1, wherein the web server hosts the interactive content.

9. A method comprising:
   receiving, by a first computing device from a web server, interactive content, wherein the interactive content comprising at least one secured field to receive a first input from the first computing device and at least one unsecured field to receive a second input from the first computing device;
   receiving, by the first computing device, the first input in the at least one secured field;
   receiving, by the first computing device, the second input in the at least one unsecured field;
   determining, by the first computing device, that the at least one secured field requires a secure connection with the web server;
   determining, by the first computing device, that the at least one unsecure field utilizes an unsecure connection with the web server;
   transmitting, by the first computing device using the secure connection, the first input to the web server; and
   transmitting, by the first computing device using the unsecure connection, the second input to the web server.

10. The method of claim 9, wherein the interactive content is secure interactive content, and wherein the method further comprises receiving the secure interactive content via a secure connection.

11. The method of claim 9, wherein the interactive content is a web-page including interactive fields.

12. The method of claim 9, wherein the secure connection is carried by hypertext transfer protocol over a secure sockets layer session.

13. The method of claim 9, wherein the at least one unsecured field comprises information for completing a product order, wherein the information for completing a product order comprises at least one of a name, an address, or an account number.

14. The method of claim 9, wherein the at least one secured field is credit card information including a credit card type and a credit card account number.

15. The method of claim 14, wherein a first input parameter includes a first portion for the credit card type comprising a selection of one of a plurality of known credit card types, and wherein the first input parameter further includes a second portion for the credit card account number corresponding to a known number format respective to the credit card type.

16. The method of claim 9, wherein the web server hosts the interactive content.

17. A non-transitory computer-readable medium including instructions that, when executed by a processor of a computing device, cause the computing device to:
   receive, from a web server, interactive content comprising at least one secured field to receive a first input from the computing device and at least one unsecured field to receive a second input from the computing device;
   receive the first input in the at least one secured field;
   receive the second input in the at least one unsecured field;
   determine that the at least one secured field requires a secure connection with the web server;
   determine that the at least one unsecure field utilizes an unsecure connection with the web server;
   transmit, using the secure connection, the first input to the web server; and
   transmit, using the unsecure connection, the second input to the web server.

18. The non-transitory computer-readable medium of claim 17, wherein the interactive content is programmed for a first browser type and a second browser type, the second browser type is different than the first browser type, and wherein the second browser type has limited rendering resources as compared to the first browser type.

19. The non-transitory computer-readable medium of claim 18, wherein the instructions when executed cause the processor to receive, from a schema server, a schema for the interactive content, wherein the schema identifies input parameters of the interactive content, wherein the at least one secured field corresponds to a first input parameter of the input parameters, and wherein the at least one unsecured field corresponds to a second input parameter of the input parameters.

20. The non-transitory computer-readable medium of claim 19, wherein the instructions when executed cause the processor to transform, using the schema, the interactive content from a first format compatible with the first browser type into a second format compatible with the second browser type of the computing device.

\* \* \* \* \*